(12) United States Patent
Kato et al.

(10) Patent No.: US 8,669,755 B2
(45) Date of Patent: Mar. 11, 2014

(54) GEOMETRY SENSOR AND INFORMATION INPUT DEVICE

(75) Inventors: Yusaku Kato, Tokyo (JP); Nobuyuki Nagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 13/190,903

(22) Filed: Jul. 26, 2011

(65) Prior Publication Data
US 2012/0025803 A1 Feb. 2, 2012

(30) Foreign Application Priority Data

Aug. 2, 2010 (JP) ................................. 2010-173500

(51) Int. Cl.
*G01B 7/28* (2006.01)
(52) U.S. Cl.
USPC ............................ 324/71.1; 324/600; 204/406
(58) Field of Classification Search
USPC ........................... 324/71.1, 451, 452; 204/446
See application file for complete search history.

(56) References Cited

U.S. PATENT DOCUMENTS

| 4,394,773 A | 7/1983 | Ruell |
| 2010/0288635 A1* | 11/2010 | Komiya et al. ............... 204/406 |

FOREIGN PATENT DOCUMENTS

| JP | 2005-039995 A | 2/2005 |
| WO | WO 89/10544 A1 | 11/1989 |
| WO | WO 98/40962 A1 | 9/1998 |

OTHER PUBLICATIONS

Lorenz et al., A novel, compliant, four degree-of-freedom robotic fingertip sensor. Oct. 2-7, 1988; 1414-9.
Pirolo et al., Piezoelectric polymer tactile sensor arrays for robotics, May 22-26, 1989; 1130-5.

* cited by examiner

*Primary Examiner* — Vincent Q Nguyen

(57) ABSTRACT

A geometry sensor includes: a detection surface including a plurality of polymer sensor elements and configured to detect an external object, the polymer sensor elements being arranged side-by-side along one or more directions and each generating a voltage according to a deformation; and a detecting section detecting a surface geometry of a region in the external object that is in contact with the detection surface, based on the voltage obtained from each of the polymer sensor elements in the detection surface.

12 Claims, 14 Drawing Sheets

GEOMETRY SENSOR AND INFORMATION INPUT DEVICE

BACKGROUND

This disclosure relates to a geometry sensor which utilizes a polymer sensor element to detect a surface geometry of an external object, and relates to an information input device using the geometry sensor.

Various sensors have been proposed that utilize a polymer sensor element which generates a voltage or electromotive force corresponding to a deformation. For one example, reference is made to Japanese Unexamined Patent Application Publication No. 2005-39995. Among such sensors, a geometry sensor which detects a surface geometry of an external object generally has a configuration in which: a detection surface thereof is structured by a single sheet configured of the polymer sensor element; and a plurality of detection electrodes are arranged on the sheet. The thus-configured geometry sensor detects the surface geometry of the external object based on a voltage obtained from each of the detection electrodes.

SUMMARY

The inventor/the inventors has/have found that, since the detection surface is structured by the single sheet configured of the polymer sensor element, the geometry sensor having the configuration discussed above is disadvantageous in that a mechanical flexibility is low and thus it is difficult for the detection surface (or the polymer sensor element) to deform in accordance with the surface geometry of the external object or to follow the surface geometry. As a result, an amount of deformation detectable is limited, making it difficult to deal with a deformation derived from an external object having a curved geometry such as a spherical surface, for example. Hence, there may be a case where the surface geometry is not appropriately detected.

To address such disadvantages, for example, a method may be contemplated where the single sheet discussed above may be cut out to provide a plurality of openings, in order to increase a deformation property of the detection surface or the polymer sensor element. For example, the single sheet may be cut out to provide openings in a net-like configuration. However, the amount of deformation detectable is still insufficient even when the method described above is employed. Further, this method makes it difficult to achieve higher definition and finer size of detection points, since the openings in the method act as a bottleneck.

Thus, it has been difficult for currently-available methods to appropriately detect the surface geometry of the external object, and a proposal that can improve the difficulty has been called for.

It is desirable to provide a geometry sensor and an information input device capable of appropriately detecting a surface geometry of an external object.

A geometry sensor according to an embodiment of the technology includes: a detection surface including a plurality of polymer sensor elements and configured to detect an external object, the polymer sensor elements being arranged side-by-side along one or more directions and each generating a voltage according to a deformation; and a detecting section detecting a surface geometry of a region in the external object that is in contact with the detection surface, based on the voltage obtained from each of the polymer sensor elements in the detection surface.

An information input device according to an embodiment of the technology includes a geometry sensor. The geometry sensor includes: a detection surface including a plurality of polymer sensor elements and configured to detect an external object, the polymer sensor elements being arranged side-by-side along one or more directions and each generating a voltage according to a deformation; and a detecting section detecting a surface geometry of a region in the external object that is in contact with the detection surface, based on the voltage obtained from each of the polymer sensor elements in the detection surface.

In the geometry sensor and the information input device according to the embodiments of the technology, the surface geometry of the region in the external object that is in contact with the detection surface is detected based on the voltage obtained from each of the polymer sensor elements which are arranged side-by-side along one or more directions in the detection surface. Thus, mechanical flexibility increases more than that of a case where a detection surface is structured by a single sheet configured of a polymer sensor element, thereby making it easier for the detection surface (the polymer sensor elements) to deform in accordance with the surface geometry of the external object or to follow the surface geometry, and allowing a range in which an amount of deformation is detectable to be increased (an upper limit of the deformation amount detectable increases). Also, in one embodiment where the polymer sensor elements are arranged along a plurality of directions, the polymer sensor elements are allowed to slide mutually at the time of the deformation in a section (in a detection point) where the polymer sensor elements intersect each other, for example. Thus, generation of stress at the time of the deformation is suppressed.

According to the geometry sensor and the information input device of the embodiments of the technology, the surface geometry of the region in the external object that is in contact with the detection surface is detected based on the voltage obtained from each of the polymer sensor elements which are arranged side-by-side along one or more directions in the detection surface. This makes it possible to increase a range in which an amount of deformation is detectable. Therefore, it is possible to appropriately detect the surface geometry of the external object. Also, for example, a shape of each of the polymer sensor elements (such as a width along an alignment direction of the polymer sensor elements) may be adjusted so as to make it possible to easily achieve higher definition and finer size of detection points.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, some embodiments of the technology will be described in detail with reference to the accompanying drawings. The description will be given in the following order.

1. First Embodiment (polymer sensor elements are arranged in X-axis and Y-axis directions and are not woven)
2. Modifications of First Embodiment
   First Modification (polymer sensor elements are arranged only in X-axis direction)
   Second Modification (polymer sensor elements are arranged only in Y-axis direction)
   Third Modification (polymer sensor elements are arranged to be more sparse in an inner region than in an outer region of a detection surface, and are not woven)
   Fourth Modification (polymer sensor elements have widths thinner in the inner region than in the outer region of the detection surface, and are not woven)
3. Second Embodiment (polymer sensor elements are arranged in X-axis and Y-axis directions and are woven (plain-weave configuration))
4. Modifications of Second Embodiment
   Fifth Modification (polymer sensor elements are arranged to be more sparse in the inner region than in the outer region of the detection surface, and are woven)
   Sixth Modification (polymer sensor elements have widths thinner in the inner region than in the outer region of the detection surface, and are woven)
   Seventh Modification (twill-weave configuration)
   Eighth Modification (sateen-weave configuration)
5. Application Examples (application examples for information input device)
6. Alternative Modifications

FIRST EMBODIMENT

Configuration of Geometry Sensor 1

Figure 1:
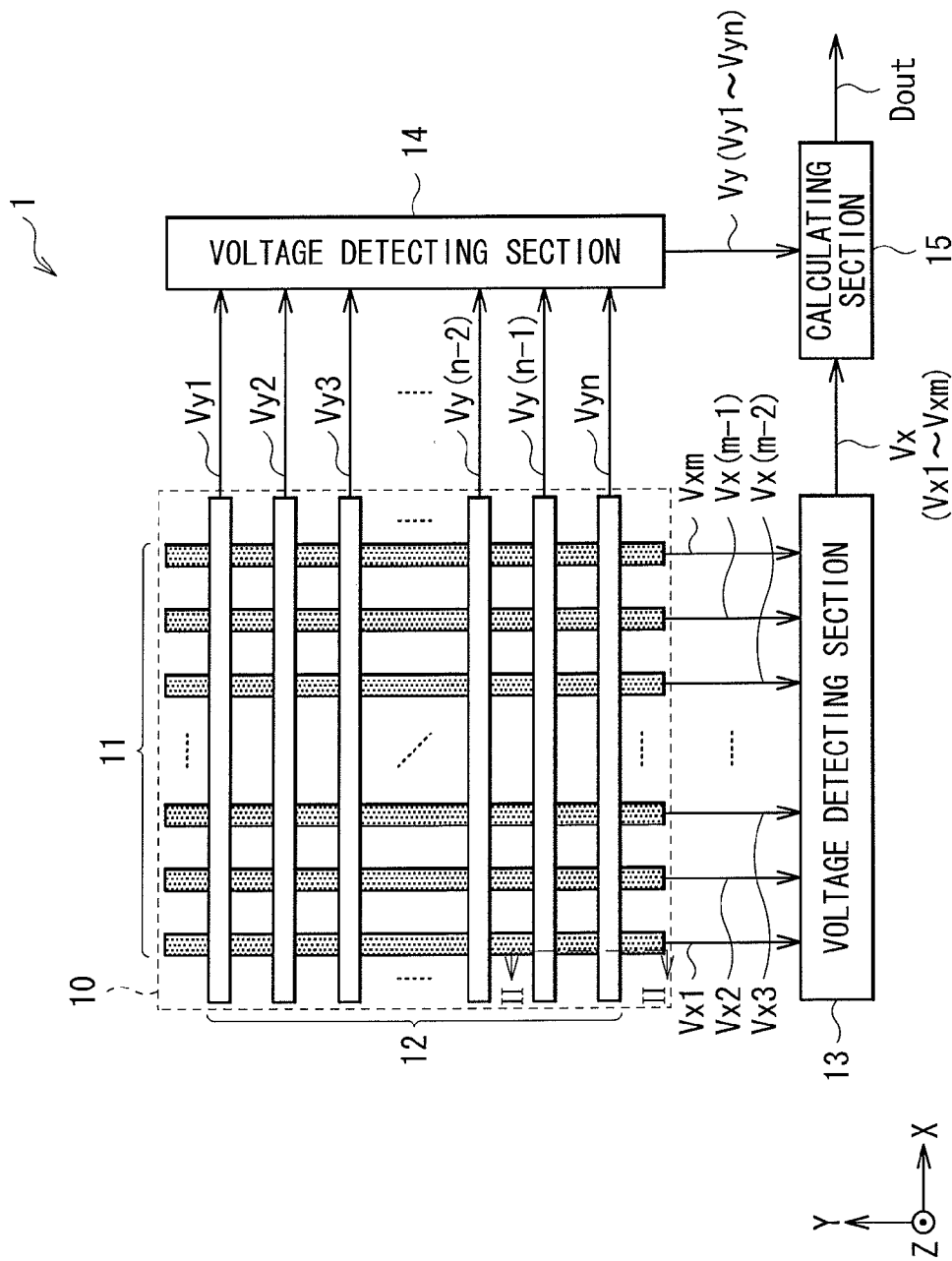
FIG. 1 illustrates a schematic configuration of a geometry sensor according to a first embodiment of the technology.
Figure 2:
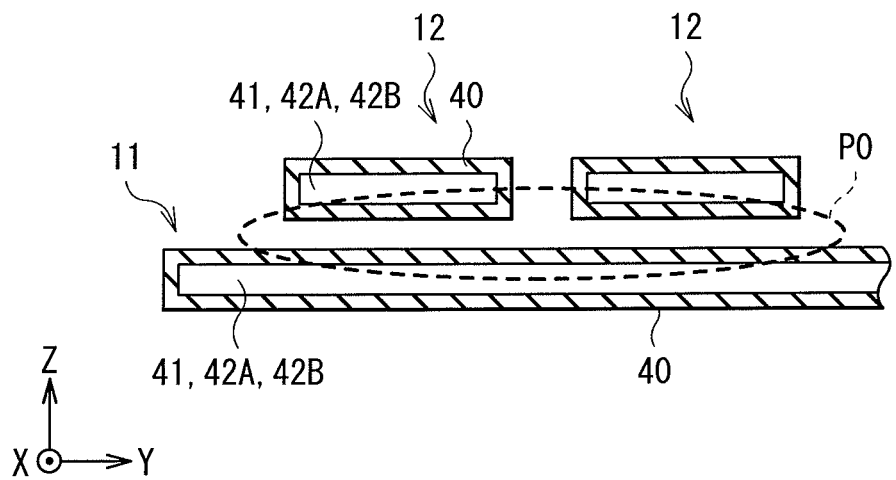
FIG. 2 is an enlarged cross-sectional view illustrating a part of the geometry sensor illustrated in FIG. 1.

FIG. 1 illustrates a schematic configuration of a geometry sensor (a geometry sensor 1) according to a first embodiment of the technology. FIG. 2 is an enlarged cross-sectional view illustrating a part of the geometry sensor 1 that is taken along a line II-II in FIG. 1. As will be described later in detail, the geometry sensor 1 is a sensor capable of detecting, in accordance with a deformation such as curvature and flexure of a detection surface 10 (deformation in an X-Y plane) caused by force applied from an external object, a surface geometry of that external object. In this embodiment, although not limitative, the geometry sensor 1 detects a three-dimensional geometry in X-axis, Y-axis, and Z-axis directions of the external object. More specifically, the geometry sensor 1 detects a surface geometry of a region of the external object that is in contact with the detection surface 10.

The geometry sensor 1 is provided with a plurality of (m-number of) polymer sensor elements 11, a plurality of (n-number of) polymer sensor elements 12, voltage detecting sections 13 and 14, and a calculating section 15, where "m" is an integer equal to or greater than 2, and "n" is an integer equal to or greater than 2. In one embodiment, the voltage detecting sections 13 and 14 and the calculating section 15 correspond to an illustrative example of a "detecting section".

Each of the polymer sensor elements 11 and 12 generates a voltage or electromotive force in accordance with the deformation caused by the force applied from the external object, and has a strip-like (or rectangular) thin-film structure. The polymer sensor elements 11 and 12 each may generate the voltage or the electromotive force in accordance with a deformation amount and a deformation direction of the deformation such as the curvature and the flexure. For example, the m-number of polymer sensor elements 11 are arranged side-by-side at substantially even intervals along an X-axis direction in the detection surface 10, and generate voltages Vx1, Vx2, ..., and Vxm in response to the deformation in a Z-axis direction, respectively. On the other hand, the n-number of polymer sensor elements 12 are arranged side-by-side at substantially even intervals along a Y-axis direction in the detection surface 10, and generate voltages Vy1, Vy2, ..., and Vyn in response to the deformation in the Z-axis direction, respectively. In other words, the polymer sensor elements 11 and 12 are arranged side-by-side along two directions which are orthogonal to each other (in the X-axis and Y-axis directions in this embodiment) in the detection surface 10. Also, as denoted by "P0" in FIG. 2 for example, a surface of each of the polymer sensor elements 11 and 12 may be covered with a later-described protective film 40. With this configuration, a position of the polymer sensor element 11 and that of the polymer sensor element 12 are unfixed with respect to each other, and the polymer sensor element 11 and the polymer sensor element 12 are allowed to slide mutually at the time of the deformation in a section (in a detection point) where the polymer sensor element 11 and the polymer sensor element 12 intersect each other. A detailed configuration of each of the polymer sensor elements 11 and 12 will be described later with reference to FIGS. 3 to 4C.

The voltage detecting section 13 detects a voltage Vx generated in each of the polymer sensor elements 11 (i.e., the voltages Vx1 to Vxm) to detect a two-dimensional geometry of the external object along the X-axis and the Z-axis directions (i.e., the two-dimensional geometry in a Z-X plane). On the other hand, the voltage detecting section 14 detects a voltage Vy generated in each of the polymer sensor elements 12 (i.e., the voltages Vy1 to Vyn) to detect a two-dimensional geometry of the external object along the Y-axis and the Z-axis directions (i.e., the two-dimensional geometry in a Y-Z plane).

The calculating section 15 obtains (calculates) the surface geometry of the external object mentioned above based on the voltages Vx (the voltages Vx1 to Vxm) detected in the voltage detecting section 13 and on the voltages Vy (the voltages Vy1 to Vyn) detected in the voltage detecting section 14, and outputs the thus-obtained surface geometry as detection data Dout. In other words, the calculating section 15 detects the surface geometry of the region that is in contact with the detection surface 10 of the external object, based on the voltages Vx and Vy obtained from the polymer sensor elements 11 and 12 in the detection surface 10. A detection method of the surface geometry will be described later in detail with reference to FIGS. 7A and 7B.

Detailed Configuration of Polymer Sensor Elements 11 and 12

Figure 3:
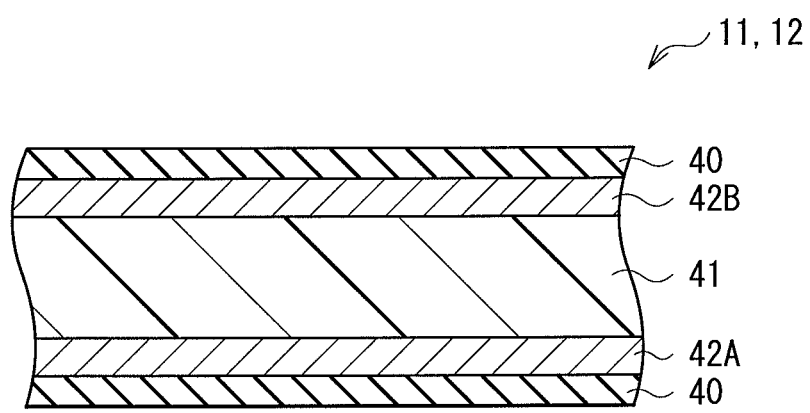
FIG. 3 is a cross-sectional view illustrating a detailed configuration of a polymer sensor element illustrated in FIGS. 1 and 2.

The detailed configuration of each of the polymer sensor elements 11 and 12 described above will now be described with reference to FIGS. 2 and 3. FIG. 3 illustrates a cross-sectional configuration of each of the polymer sensor elements 11 and 12.

As illustrated in FIG. 3, each of the polymer sensor elements 11 and 12 has a stacked structure in which a pair of electrode films 42A and 42B are attached to both surfaces of an ion-conductive highly-polymerized compound film 41 (hereinafter simply referred to as a "highly-polymerized compound film 41"). In other words, each of the polymer sensor elements 11 and 12 has the pair of electrode films 42A and 42B, and the highly-polymerized compound film 41 inserted between those electrode films 42A and 42B. Also, both surfaces of each of the polymer sensor elements 11 and 12 may be covered with the protective film 40, as illustrated in FIGS. 2 and 3. The protective film 40 has an insulating property, and configured by a material having high elasticity. The high-elasticity material can be polyurethane, parylene, or other suitable material. In an alternative embodiment, the protective film 40 may not be provided in some cases. Also, in another embodiment, the detection surface 10 as a whole may be coated with a film having flexibility, instead of the protective film 40. The film having the flexibility can be a silicone rubber or other suitable material.

The highly-polymerized compound film 41 is impregnated with a cation substance. As used herein, the term "cation substance" refers to a substance which includes the cation and a polar solvent, or a substance which includes a liquid cation. The substance including the cation and the polar solvent can be a substance in which the cation is solvated in the polar solvent, for example. The liquid cation can be a cation structuring an ionic liquid, for example. The substance including the liquid cation can be an ionic liquid, for example.

A material structuring the highly-polymerized compound film 41 can be an ion-exchange resin having, as a skeleton, a fluorine resin or a hydrocarbon system, for example. The ion-exchange resin can be an anion-exchange resin, a cation-exchange resin, or an anion-cation-exchange resin, for example. Among these ion-exchange resins, the cation-exchange resin is preferable, although it is not strictly necessary.

The cation-exchange resin can be a material introduced with an acidic group such as, but not limited to, a sulfonic acid group and a carboxyl group. The material can be polyethylene having an acidic group, polystyrene having the acidic group, a fluorine resin having the acidic group, or other suitable material. Among these materials, a fluorine resin having the sulfonic acid group or a carboxylic acid group is preferable, and Nafion (Registered Trade Mark, commercially available from DuPont, Wilmington, Del.) is particularly preferable, although they are not strictly necessary.

It is preferable, but not strictly necessary, that the cation substance impregnated in the highly-polymerized compound film 41 be a material which includes a metal ion and water, a material which includes an organic cation and water, or the ionic liquid. The metal ion can be a light metal ion such as, but not limited to, sodium ion ($Na^+$), a potassium ion ($K^+$), a lithium ion ($Li^+$), and a magnesium ion ($Mg^{2+}$). The organic cation can be an alkylammonium ion, for example. The cation is present in the highly-polymerized compound film 41 as hydrate. Thus, when the cation substance including the cation and the water is impregnated in the highly-polymerized compound film 41, it is preferable, but not strictly necessary, that the polymer sensor elements 11 and 12 are respectively sealed as a whole in order to suppress evaporation of water.

The ionic liquid may sometimes be referred to as an ambient temperature molten salt, and includes a cation and an anion having a fire-retardant property and low volatility. In the ionic liquid, the cation structuring the ionic liquid has a larger ion radius than that of the anion. The ionic liquid can be a compound such as, but not limited to, an imidazolium ring-system compound, a pyridinium ring-system compound, and an aliphatic system compound.

In particular, it is preferable, but not strictly necessary, that the cation substance be the ionic liquid. One reason is that the ionic liquid is low in volatility and thus the polymer sensor elements 11 and 12 operate advantageously under high-temperature atmosphere or in vacuum.

Each of the electrode films 42A and 42B includes one or more kinds of conductive materials. It is preferable, but not strictly necessary, that each of the electrode films 42A and 42B be a film in which conductive material powders are mutually bonded through a conductive polymer, since this increases flexibility of the electrode films 42A and 42B. The conductive material powder is preferably a carbon powder, since the carbon powder is high in conductivity and high in specific surface area so that a larger amount of deformation is obtained, although it is not strictly necessary. The carbon powder is preferably KetjenBlack (Registered Trade Mark), although it is not strictly necessary. The conductive polymer is preferably a material which is similar to the material structuring the highly-polymerized compound film 41 described above, although it is not strictly necessary.

The electrode films 42A and 42B may be formed by applying a coating material, having the conductive material powder and the conductive polymer that are dispersed in a dispersion medium, to both surfaces of the highly-polymerized compound film 41, and then drying the same, for example. Alternatively, a film-like member including the conductive material powder and the conductive polymer may be pressure-bonded to both sides of the highly-polymerized compound film 41.

Each of the electrode films 42A and 42B may have a multilayer structure. In one embodiment where the electrode films 42A and 42B each have the multilayer structure, it is preferable, but not strictly necessary, that the electrode films 42A and 42B each have a stacked configuration including, in order from the highly-polymerized compound film 41 side: a layer in which the conductive material powders are mutually bonded through the conductive polymer; and a metal layer. One reason is that this allows an electric potential to approach a more uniform value in an in-plane direction of each of the electrode films 42A and 42B, and enables to achieve better deformation performance. A material structuring the metal layer can be a precious metal such as, but not limited to, gold and platinum. A thickness of the metal layer is optional, although the metal layer is preferably, but not strictly necessary, a continuous film such that the potential becomes uniform in each of the electrode films 42A and 42B. A method of forming the metal film can be a plating method, a vapor deposition method, a sputtering method, or other suitable method.

In one embodiment where the substance including the cation and the polar solvent is used for the cation substance in each of the polymer sensor elements 11 and 12, almost no anion is included in the highly-polymerized compound film 41.

With this configuration, the voltage (the electromotive force) is generated between the electrode film 42A and the electrode film 42B when the highly-polymerized compound film 41 is deformed (such as being curved or flexed) in a direction orthogonal to a film plane (in the Z-axis direction in this embodiment) in each of the polymer sensor elements 11 and 12, as will be described later in greater detail. It is to be noted that a size including a width and a length of the highly-polymerized compound film 41 is optional and may be set on an as-needed basis depending on the estimated or predetermined amount of deformation (or a displacement amount) of the highly-polymerized compound film 41.

Basic Operation of Polymer Sensor Elements 11 and 12

Figure 4A:
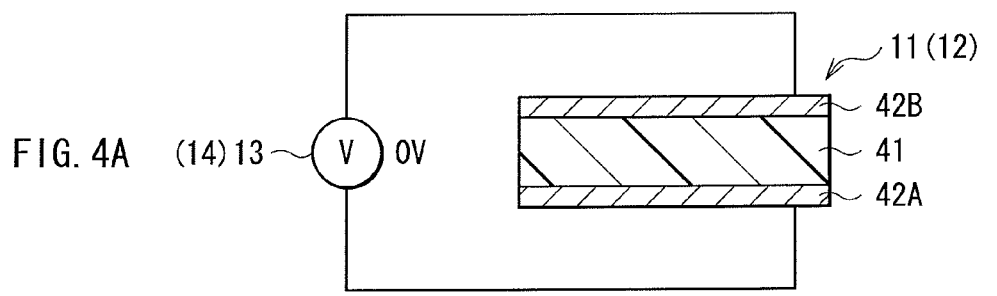
FIGS. 4A to 4C are schematic cross-sectional views for describing a basic operation of the polymer sensor element.
Figure 4B:
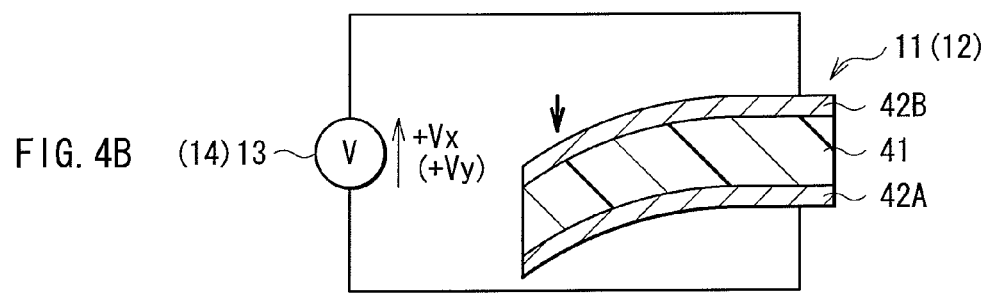
Figure 4C:
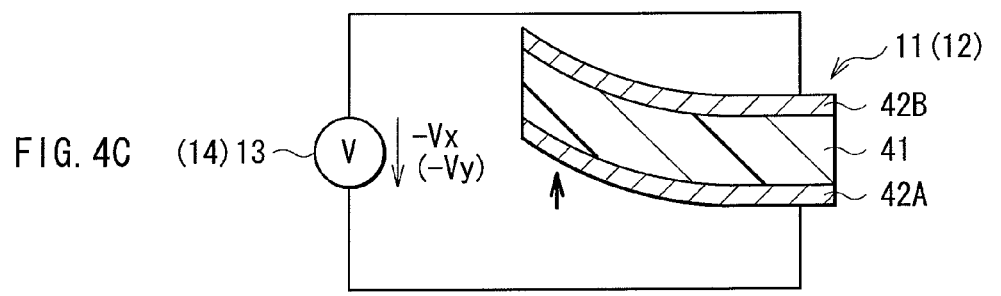

A basic operation of the polymer sensor elements 11 and 12 having the configuration described above will now be described with reference to FIGS. 4A to 4C. FIGS. 4A to 4C are cross-sectional views schematically illustrating the basic operation of the polymer sensor elements 11 and 12.

First, one embodiment will be described where the highly-polymerized compound film 41 includes the cation and the polar solvent for the cation substance.

When each of the polymer sensor elements 11 and 12 has not been applied with the force arising from the external object, each of the polymer sensor elements 11 and 12 is in a planar state without causing the deformation such as the curvature and the flexure, as illustrated in FIG. 4A. Thereby, the cation substances are dispersed substantially uniformly in the highly-polymerized compound film 41. Hence, a potential difference (i.e., the voltages Vx and Vy) is not generated between the electrode film 42A and the electrode film 42B, and the voltages detected by the voltage detecting sections 13 and 14 are at zero volts.

Here, each of the polymer sensor elements 11 and 12 deforms (such as being curved or flexed) when the force arising from the external object is applied to each of the polymer sensor elements 11 and 12, as illustrated in FIGS. 4B and 4C.

For example, when each of the polymer sensor elements 11 and 12 is deformed in a negative direction on the Z-axis (deformed on the electrode film 42A side), a region on the electrode film 42A side of the highly-polymerized compound film 41 contracts, whereas a region on the electrode film 42B side of the highly-polymerized compound film 41 swells, as illustrated in FIG. 4B. As a result, the cations move toward the electrode film 42B side of the highly-polymerized compound film 41 with a state in which the cations are solvated in the polar solvent, so that the cations are dense on the electrode film 42B side of the highly-polymerized compound film 41, whereas the cations are rough on the electrode film 42A side of the highly-polymerized compound film 41. Hence, the voltages Vx and Vy (positive polarity voltages +Vx and +Vy), whose each potential is higher on the electrode film 42B side than on the electrode film 42A side, are generated in the polymer sensor elements 11 and 12, respectively.

In contrast, when each of the polymer sensor elements 11 and 12 is deformed in a positive direction on the Z-axis (deformed on the electrode film 42B side), the region on the electrode film 42B side of the highly-polymerized compound film 41 contracts, whereas the region on the electrode film 42A side of the highly-polymerized compound film 41 swells, as illustrated in FIG. 4C. As a result, the cations move toward the electrode film 42A side of the highly-polymerized compound film 41 with the state in which the cations are solvated in the polar solvent, so that the cations are dense on the electrode film 42A side of the highly-polymerized compound film 41, whereas the cations are rough on the electrode film 42B side of the highly-polymerized compound film 41. Hence, the voltages Vx and Vy (negative polarity voltages −Vx and −Vy), whose each potential is higher on the electrode film 42A side than on the electrode film 42B side, are generated in the polymer sensor elements 11 and 12, respectively.

Next, one embodiment will be described where the highly-polymerized compound film 41 includes the ionic liquid, which includes the liquid cation, for the cation substance.

Likewise, when each of the polymer sensor elements 11 and 12 has not been applied with the force arising from the external object, each of the polymer sensor elements 11 and 12 is in a planar state without causing the deformation, as illustrated in FIG. 4A. Thereby, the ionic liquid is dispersed substantially uniformly in the highly-polymerized compound film 41. Hence, the potential difference (i.e., the voltages Vx and Vy) is not generated between the electrode film 42A and the electrode film 42B, and the voltages detected by the voltage detecting sections 13 and 14 are at zero volts.

Here, each of the polymer sensor elements 11 and 12 deforms when the force arising from the external object is applied to each of the polymer sensor elements 11 and 12, as illustrated in FIGS. 4B and 4C.

For example, when each of the polymer sensor elements 11 and 12 is deformed in the negative direction on the Z-axis (deformed on the electrode film 42A side), the region on the electrode film 42A side of the highly-polymerized compound film 41 contracts, whereas the region on the electrode film 42B side of the highly-polymerized compound film 41 swells, as illustrated in FIG. 4B. As a result, the cations in the ionic liquid move toward the electrode film 42B side of the highly-polymerized compound film 41 whereas the anions therein move toward the electrode film 42A side, since the cations structuring the ionic liquid are larger in the ion radius than the anions. Hence, the voltages Vx and Vy (the positive polarity voltages +Vx and +Vy), whose each potential is higher on the electrode film 42B side than on the electrode film 42A side, are generated in the polymer sensor elements 11 and 12, respectively.

In contrast, when each of the polymer sensor elements 11 and 12 is deformed in the positive direction on the Z-axis (deformed on the electrode film 42B side), the region on the electrode film 42B side of the highly-polymerized compound film 41 contracts, whereas the region on the electrode film 42A side of the highly-polymerized compound film 41 swells, as illustrated in FIG. 4C. As a result, for a similar reason to that described above, the cations in the ionic liquid move toward the electrode film 42A side of the highly-polymerized compound film 41, whereas the anions therein move toward the electrode film 42B side. Hence, the voltages Vx and Vy (the negative polarity voltages −Vx and −Vy), whose each potential is higher on the electrode film 42A side than on the electrode film 42B side, are generated in the polymer sensor elements 11 and 12.

Operation and Effect of Motion Sensor 1

An operation and an effect of the geometry sensor 1 as a whole according to this embodiment will now be described in comparison to first and second comparative examples.

1. Basic Operation

In the geometry sensor 1, the polymer sensor elements 11 and 12 illustrated in FIG. 1 and FIGS. 4A to 4C deform when the force arising from the external object is applied to the detection surface 10 structured by the polymer sensor elements 11 and 12.

As a result, the potential difference (the voltages Vx and Vy) is generated between the electrode film 42A and the electrode film 42B in each of the polymer sensor elements 11 and 12. The voltage Vx is detected by the voltage detecting section 13, and the voltage Vy is detected by the voltage detecting section 14. The calculating section 15 detects the surface geometry (the three-dimensional geometry) of the region of the external object that is in contact with the detection surface 10 based on those voltages Vx and Vy.

First Comparative Example

Figure 5:
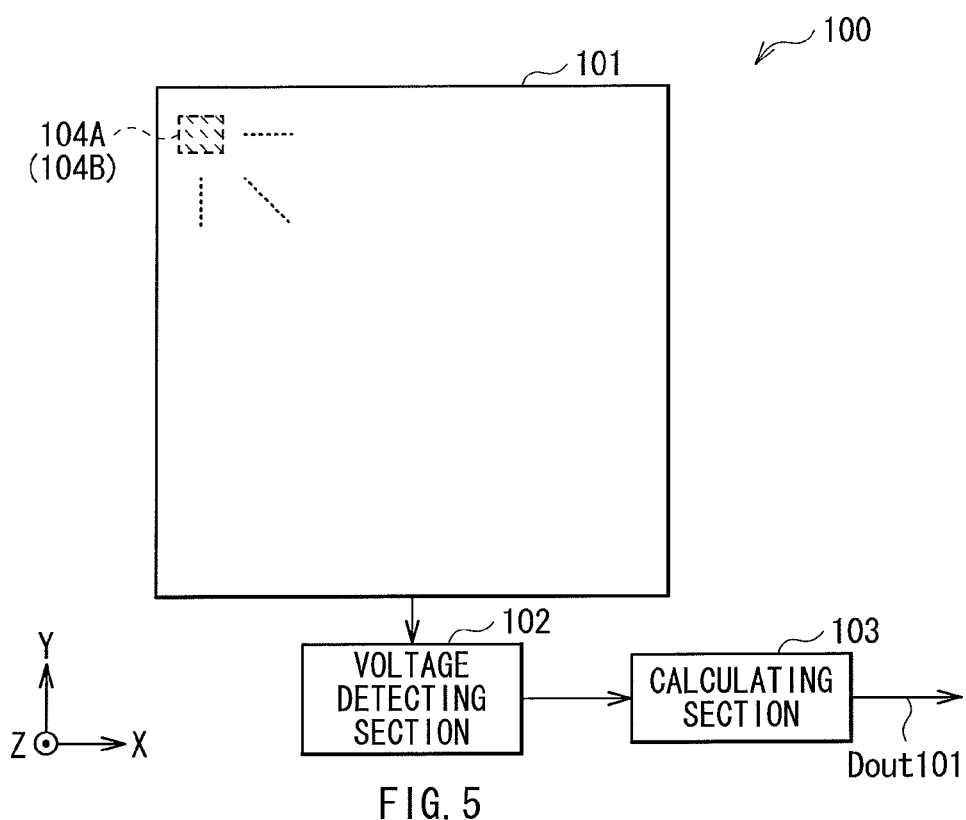
FIG. 5 illustrates a schematic configuration of a geometry sensor using a polymer sensor element according to a first comparative example.

In a geometry sensor 100 according to the first comparative example illustrated in FIG. 5, a detection surface is structured by a single sheet configured of a polymer sensor element 101, and a plurality of detection electrodes 104A and 104B each configured of a pair of electrode films are disposed on the sheet. A voltage obtained from each of the detection electrodes 104A and 104B is detected by a voltage detecting section 102. A surface geometry of an external object is detected in a calculating section 103 (i.e., detection data Dout101 is outputted from the calculating section 103) based on the voltage in each of the detection electrodes 104A and 104B.

However, since the detection surface is structured by the single sheet configured of the polymer sensor element 101, the geometry sensor 100 according to the first comparative example is disadvantageous in that a mechanical flexibility is low and thus it is difficult for the detection surface (or the polymer sensor element 101) to deform in accordance with the surface geometry of the external object or to follow the surface geometry. As a result, an amount of deformation detectable is limited, making it difficult to deal with a deformation derived from an external object having a curved geometry such as a spherical surface, for example. Hence, there may be a case where the surface geometry is not appropriately detected.

Second Comparative Example

Figure 6:
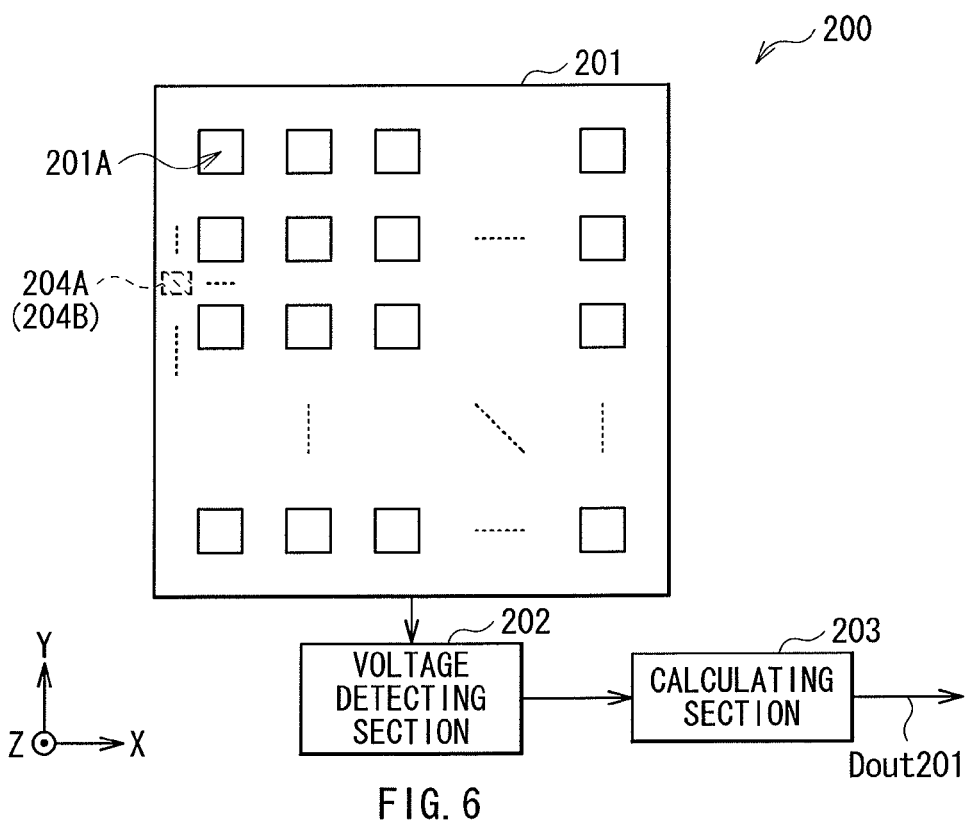
FIG. 6 illustrates a schematic configuration of a geometry sensor using a polymer sensor element according to a second comparative example.

In a geometry sensor 200 according to the second comparative example illustrated in FIG. 6, a single sheet similar to that of the first comparative example discussed above is cut out to provide a plurality of openings 201A in a net-like configuration, in order to increase a deformation property of a detection surface or the polymer sensor element 201. Thus, the plurality of openings 201A are provided, in addition to the plurality of detection electrodes 204A and 204B, on the single sheet configured of the polymer sensor element 201. Also, in the geometry sensor 200 of the second comparative example, a voltage obtained from each of the detection electrodes 204A and 204B is detected by a voltage detecting section 202, and a surface geometry of an external object is detected in a calculating section 203 (i.e., detection data Dout201 is outputted from the calculating section 203) based on the voltage in each of the detection electrodes 204A and 204B, as in the first comparative example described above.

However, the second comparative example also employs the single sheet to configure the detection surface, unlike the first embodiment as will be described later in greater detail. Thus, although the amount of deformation detectable increases to a certain extent by the provision of the plurality of openings 201A, the amount of deformation detectable is still insufficient. Further, the second comparative example makes it difficult to achieve higher definition and finer size of detection points (correspond respectively to positions of the detection electrodes 204A and 204B in this case) as illustrated in the drawing, since the openings 201A in the second comparative example act as a bottleneck.

2. Detection Operation of First Embodiment

Unlike the first and the second comparative examples described above, the geometry sensor 1 according to the first embodiment uses the plurality of polymer sensor elements 11 and the plurality of polymer sensor elements 12 that are arranged side-by-side in the detection surface 10, respectively, to detect the surface geometry of the external object. In the following, the detection operation of the surface geometry of the external object in the first embodiment will be described in detail.

Figure 7A:
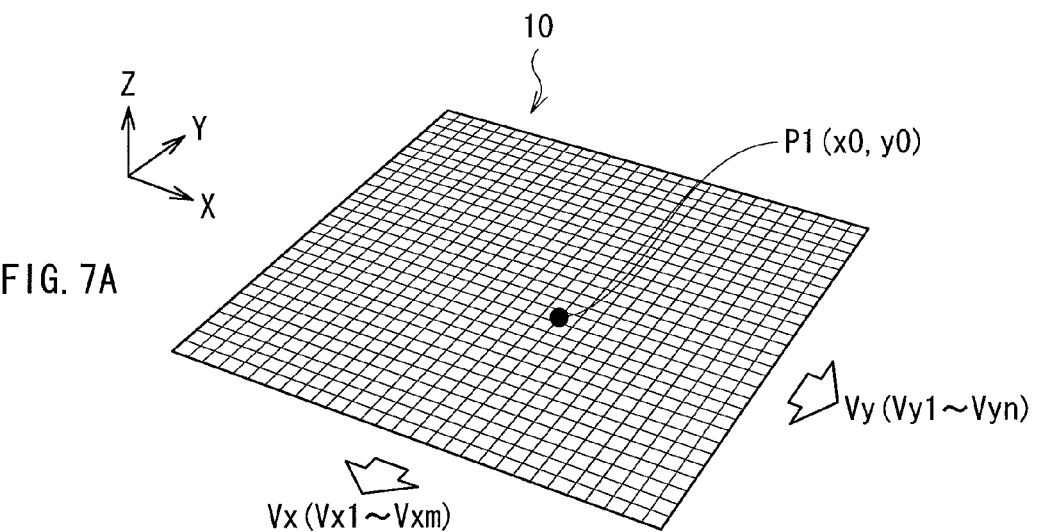
FIGS. 7A and 7B are schematic illustrations for describing an operation of the geometry sensor illustrated in FIG. 1.
Figure 7B:
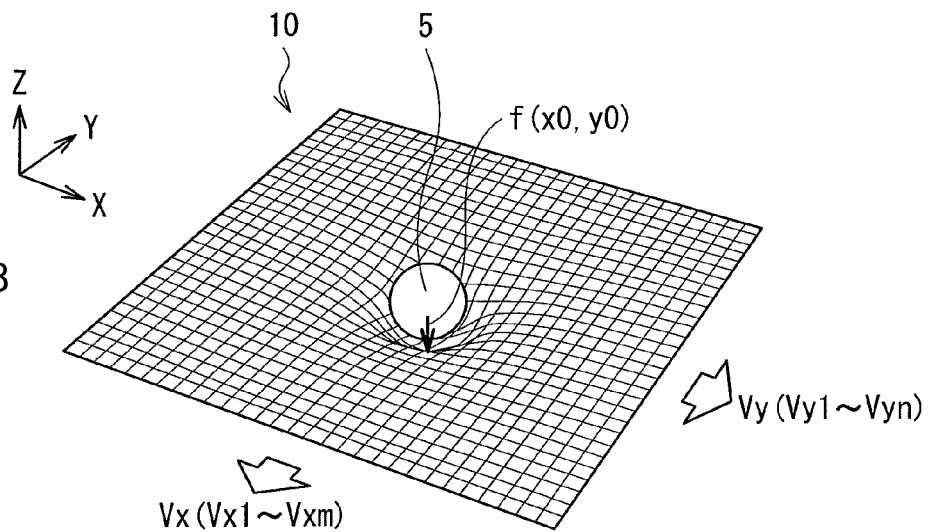

Here, as illustrated schematically in FIGS. 7A and 7B, for example, the description is provided here based on the premise that an amount of deformation derived from the external object 5 in a certain position P1 (x0, y0) in the detection surface 10 is f (x0, y0).

Referring to FIG. 7B, for example, when the detection surface 10 (i.e., the polymer sensor elements 11 and 12) is deformed in the neighborhood of the position P1 (x0, y0), the voltages Vx and Vy are selectively generated in the polymer sensor elements 11 and 12 that are located in the neighborhood region, respectively. Here, the following equations (1) and (2) are obtained, where a relationship between the deformation amount f (x, y) in the above-described detection surface 10 (the polymer sensor elements 11 and 12) and the voltages Vx and Vy obtained respectively from the polymer sensor elements 11 and 12 is defined as a function u (f (x, y)). For the purpose of convenience, the voltages Vx and Vy in the position P1 (x0, y0) are defined as Vx (x0) and Vy (y0), respectively.

$$Vx(x0) = u(f(x0,y)) \tag{1}$$

$$Vy(y0) = u(f(x,y0)) \tag{2}$$

Therefore, characteristics of the function u (x, y) may be determined in advance by previously-performed device evaluation (characterization of the polymer sensor elements 11 and 12), to thereby make it possible to obtain the deformation amount f (x0, y0) by using the above-described equations (1) and (2) in the calculating section 15. More specifically, it is possible to calculate the deformation amount f (x0, y0) in any position P1 (x0, y0) on the detection surface 10 by using the characteristics of the function u (x, y) and a set of the voltages Vx (x0) and Vy (y0). It is to be noted that a collection (a position distribution) of the deformation amounts f (x0, y0) in all of the positions (the detection points) on the detection surface 10 corresponds to the detection data Dout illustrated in FIG. 1.

According to the first embodiment, the geometry sensor 1 detects the surface geometry of the region of the external object that is in contact with the detection surface 10, based on the voltages Vx and Vy obtained from the plurality of (the m-number of) polymer sensor elements 11 and the plurality of (the n-number of) polymer sensor elements 12 that are arranged side-by-side along the two directions orthogonal to each other (in the X-axis and Y-axis directions) in the detection surface 10, respectively. Thus, the mechanical flexibility of the detection surface 10 (the polymer sensor elements 11 and 12) increases as compared with the geometry sensor in which the detection surface is structured by the single sheet configured of the polymer sensor element such as that according to each of the first and the second comparative examples described above. Hence, it makes it easier for the detection surface 10 (the polymer sensor elements 11 and 12) to deform in accordance with the surface geometry of the external object or to follow the surface geometry, and to allow a range in which the deformation amount f (x, y) is detectable by the geometry sensor 1 to be increased as compared with that according to each of the first and the second comparative examples described above (an upper limit of the deformation amount f (x, y) detectable increases).

Also, the polymer sensor element 11 and the polymer sensor element 12 are allowed to slide mutually at the time of the deformation in the section (in the detection point) where the polymer sensor element 11 and the polymer sensor element 12 intersect each other. Thus, a generation of stress at the time of the deformation is suppressed.

According to the first embodiment as described, the surface geometry of the region of the external object that is in contact with the detection surface 10 is detected based on the voltages Vx and Vy obtained from the plurality of (the m-number of) polymer sensor elements 11 and the plurality of (the n-number of) polymer sensor elements 12 that are arranged side-by-side along the two directions orthogonal to each other (in the X-axis and Y-axis directions) in the detection surface 10, respectively. This makes it possible to increase the range in which the deformation amount f (x, y) is detectable by the geometry sensor 1 (i.e., it makes it possible to increase the upper limit of the deformation amount f (x, y) detectable). Therefore, it is possible to appropriately detect (such as accurately detect and sensitively detect) the surface geometry of the external object.

Also, for example, a shape (such as a width along an alignment direction) of each of the polymer sensor elements 11 and 12 may be adjusted so as to make it possible to easily achieve higher definition and finer size of the detection points in the detection surface 10, unlike the second comparative example described above. In an embodiment where the width along the alignment direction of each of the polymer sensor elements 11 and 12 is made thin, it is possible to further increase the mechanical flexibility (the easier deformation) in the detection surface 10 (the polymer sensor elements 11 and 12).

Further, since the generation of the stress at the time of the deformation can be suppressed as described above, it is also possible to improve reliability of the geometry sensor 1 (such as to improve durability and to suppress time degradation).

Modifications of First Embodiment

In the following, modifications (first to fourth modifications) of the first embodiment described above will be described. Note that the same or equivalent elements as those of the first embodiment described above are denoted with the same reference numerals, and will not be described in detail.

First and Second Modifications

Figure 8A:
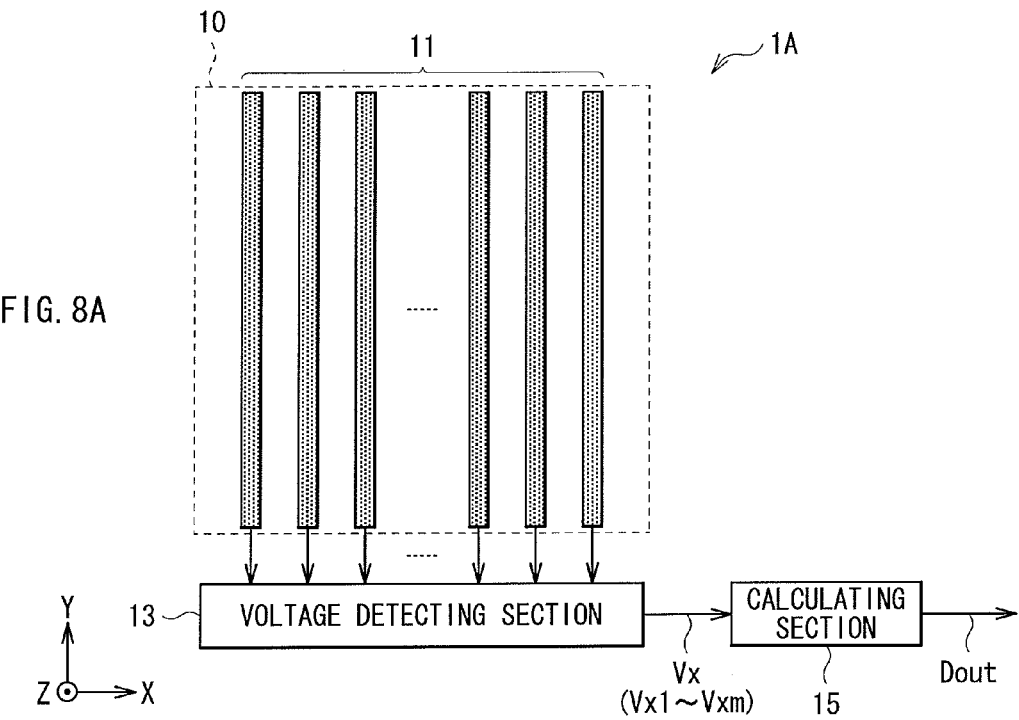
FIGS. 8A and 8B illustrate schematic configurations of geometry sensors according to a first modification and a second modification, respectively.
Figure 8B:
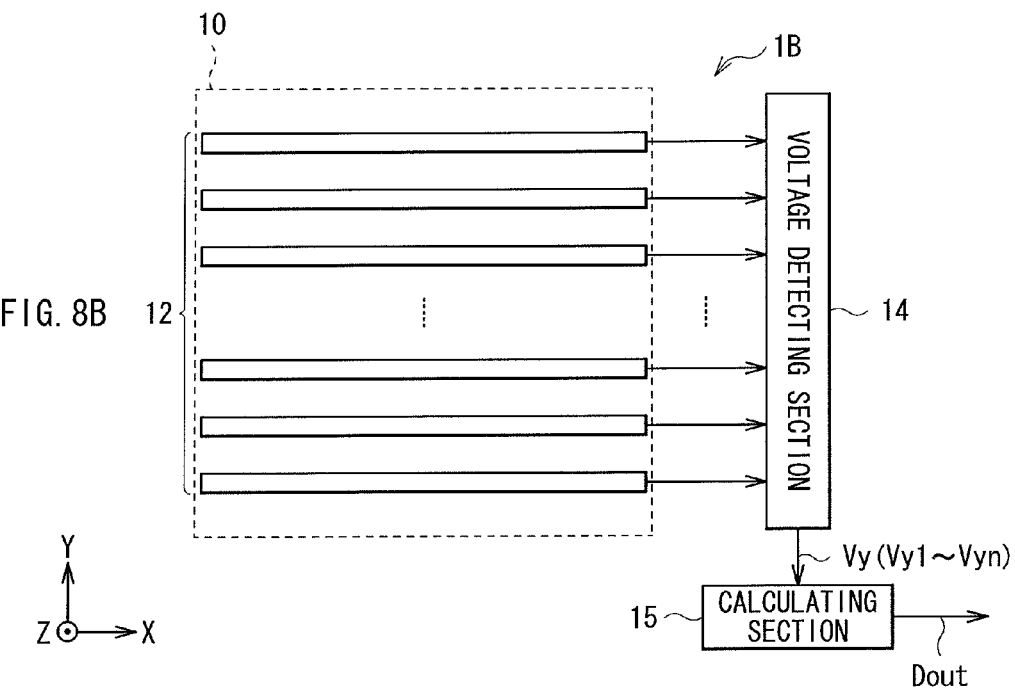

FIG. 8A illustrates a schematic configuration of a geometry sensor 1A according to a first modification, and FIG. 8B illustrates a schematic configuration of a geometry sensor 1B according to a second modification. Each of the first and the second modifications differs from the first embodiment described above, in that the plurality of polymer sensor elements are arranged side-by-side only along one direction in the detection surface 10.

In the geometry sensor 1A according to the first modification, the plurality of polymer sensor elements 11 are arranged side-by-side along the X-axis direction in the detection surface 10, whereas the polymer sensor elements are not arranged side-by-side in the Y-axis direction. Thus, in the first modification, the calculating section 15 uses only the voltages Vx detected in the voltage detecting section 13 to generate and output the detection data Dout, as illustrated in FIG. 8A. In other words, the geometry sensor 1A is capable of detecting a surface geometry of an external object corresponding to a two-dimensional geometry in the X-axis and the Z-axis directions.

In the geometry sensor 1B according to the second modification, the plurality of polymer sensor elements 12 are arranged side-by-side along the Y-axis direction in the detection surface 10, whereas the polymer sensor elements are not arranged side-by-side in the X-axis direction. Thus, in the second modification, the calculating section 15 uses only the voltages Vy detected in the voltage detecting section 14 to generate and output the detection data Dout, as illustrated in FIG. 8B. In other words, the geometry sensor 1B is capable of detecting a surface geometry of an external object corresponding to a two-dimensional geometry in the Y-axis and the Z-axis directions.

As in the first embodiment described above, the geometry sensors 1A and 1B having the configurations described above are each capable of appropriately detecting (such as accurately detecting and sensitively detecting) the surface geometry of the external object. In other words, the plurality of polymer sensor elements may be arranged side-by-side along at least one direction in the detection surface 10.

Third and Fourth Modifications

Figure 9A:
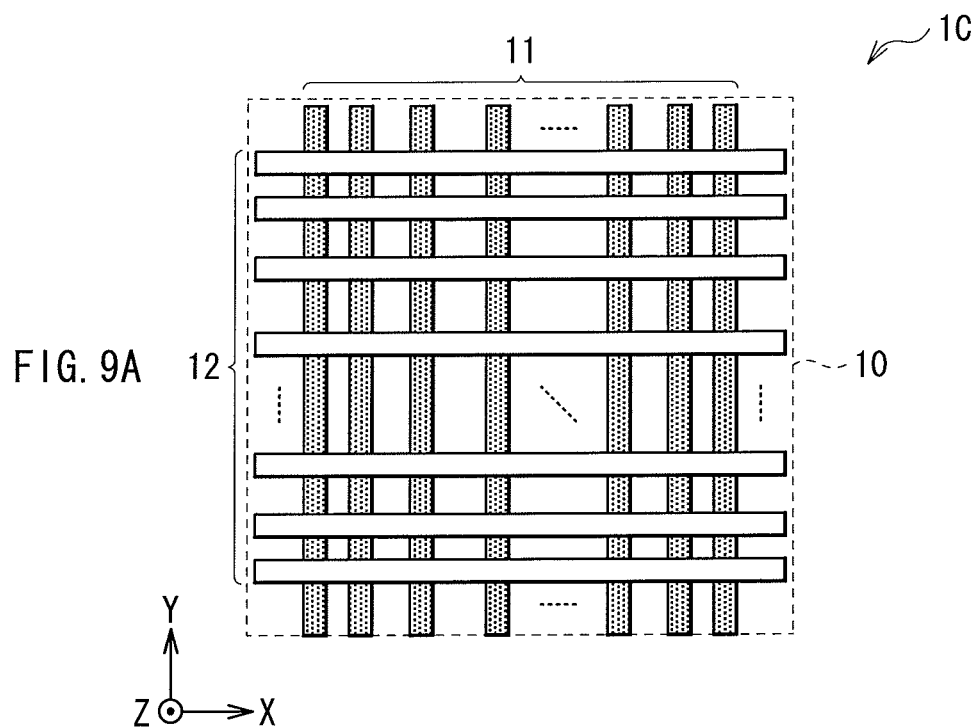
FIGS. 9A and 9B illustrate schematic configurations of geometry sensors according to a third modification and a fourth modification, respectively.
Figure 9B:
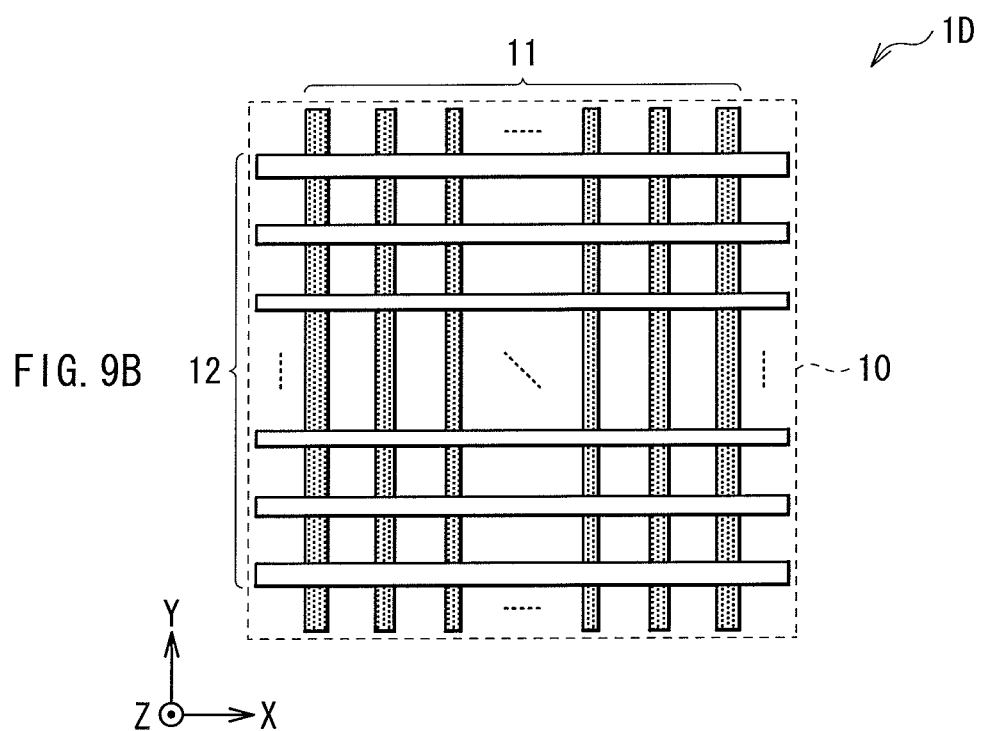

FIG. 9A illustrates a schematic configuration of a geometry sensor 1C according to a third modification, and FIG. 9B illustrates a schematic configuration of a geometry sensor 1D according to a fourth modification. For the purpose of convenience, illustrations of the voltage detecting sections 13 and 14 and the calculating section 15 are omitted in FIGS. 9A and 9B.

The geometry sensor 1C according to the third modification differs from that of the first embodiment described above, in that the polymer sensor elements 11 and 12 are arranged to be more sparse in an inner region than in an outer region of the detection surface 10. In other words, the polymer sensor elements 11 and 12 are arranged to be more packed in the outer region than in the inner region of the detection surface 10. For example, the polymer sensor elements 11 and 12 are each arranged to be more sparse gradually from the outer region toward the inner (such as a middle part and a central part of the detection surface 10) region in the detection surface 10.

The geometry sensor 1D according to the fourth modification differs from that of the first embodiment described above, in that widths in the alignment directions of the polymer sensor elements 11 and 12 (i.e., the X-axis direction and the Y-axis direction, respectively) are thinner in the inner region than in the outer region of the detection surface 10. In other words, the widths in the alignment directions of the polymer sensor elements 11 and 12 are thicker in the outer region than in the inner region of the detection surface 10. For example, the widths in the alignment directions of the polymer sensor elements 11 and 12 become thinner gradually from the outer region toward the inner (such as the middle part and the central part of the detection surface 10) region in the detection surface 10.

Each of the configurations according to the third and the fourth modifications makes it possible, in the geometry sensors 1C and 1D, to increase mechanical flexibility (easier deformation) in the detection surface 10, especially in the inner (such as the middle part and the central part of the detection surface 10) region of the detection surface 10. Therefore, since the external object is, in general, detected more likely in the inner region than in the outer region in the detection surface 10, it possible to further appropriately detect (such as further accurately detect and further sensitively detect) the surface geometry of the external object.

In the third and the fourth modifications described above, the density of arrangement or the width in the alignment direction is changed for both of the polymer sensor elements 11 and 12. Alternatively, the density of arrangement or the width in the alignment direction may be changed only for one of the polymer sensor elements 11 and 12. Also, when the plurality of polymer sensor elements are disposed side-by-side only along one direction in the detection surface 10 as in the first and the second modifications described above, the density of arrangement or the width in the alignment direction of those polymer sensor elements may be changed.

SECOND EMBODIMENT

A second embodiment of the technology will now be described. Note that the same or equivalent elements as those of the first embodiment described above are denoted with the same reference numerals, and will not be described in detail.

Figure 10:
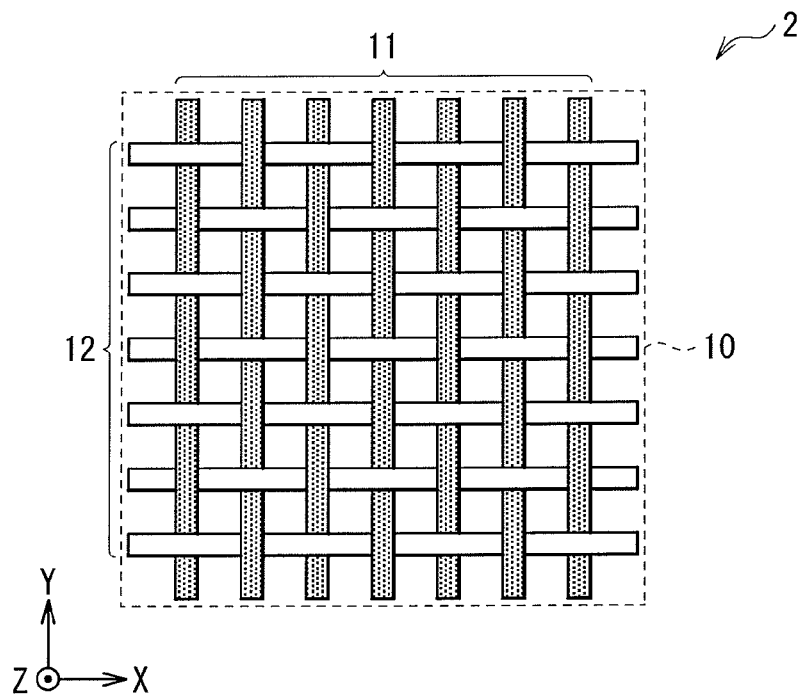
FIG. 10 illustrates a schematic configuration of a geometry sensor according to a second embodiment of the technology.
Figure 11:
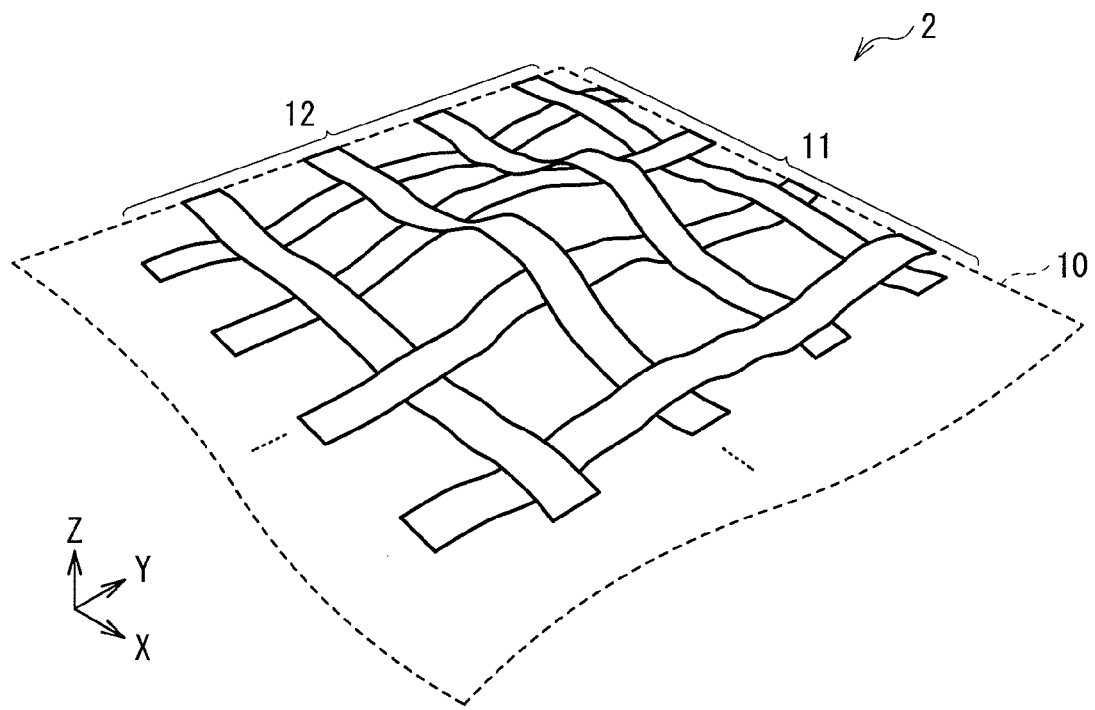
FIG. 11 is an enlarged perspective view illustrating a part of the geometry sensor illustrated in FIG. 10.

FIG. 10 illustrates a schematic configuration of a geometry sensor (a geometry sensor 2) according to the second embodiment. FIG. 11 is an enlarged perspective view illustrating a part of the geometry sensor 2. For the purpose of convenience, illustrations of the voltage detecting sections 13 and 14 and the calculating section 15 are omitted in FIGS. 10 and 11.

In the geometry sensor 2 according to the second embodiment, the plurality of polymer sensor elements 11 aligned along the X-axis direction and the plurality of polymer sensor elements 12 aligned along the Y-axis direction in the detection surface 10 are in a woven configuration in which the polymer sensor elements 11 and 12 are woven mutually as a whole. The second embodiment employs a plain-weave configuration as the woven configuration, which may be a basic configuration among various woven configurations. In other words, a configuration is employed where each of the plurality of polymer sensor elements 11 aligned along the X-axis direction and each of the plurality of polymer sensor elements 12 aligned along the Y-axis direction are mutually woven one-by-one in an alternate fashion.

As described, in the second embodiment, the polymer sensor elements 11 and 12 have the woven configuration in which the polymer sensor elements 11 and 12 are woven mutually. Thus, the mechanical flexibility of the detection surface 10 (the polymer sensor elements 11 and 12) increases more than that according to the first embodiment described above. One reason is that affinity for a geometry of a free-form surface of the external object increases further when the polymer sensor elements 11 and 12 are adapted to have the woven configuration. Hence, in the geometry sensor 2 according to the second embodiment, it makes it further easier for the detection surface 10 (the polymer sensor elements 11 and 12) to deform in accordance with the surface geometry of the external object or to follow the surface geometry, and to allow a range in which the deformation amount f (x, y) is detectable to be further increased (an upper limit of the deformation amount f (x, y) detectable further increases). Therefore, it is possible to further appropriately detect (such as further accurately detect and further sensitively detect) the surface geometry of the external object as compared with the first embodiment described above.

Also, the polymer sensor element 11 and the polymer sensor element 12 are easier to slide mutually at the time of the deformation since the polymer sensor elements 11 and 12 have the woven configuration with respect to each other. Thus, the generation of stress at the time of the deformation is further suppressed as compared with the first embodiment described above.

Moreover, a typical fabric technique can be utilized to manufacture the polymer sensor elements 11 and 12 having the woven configuration described above. Thus, the second embodiment is adaptable to fabrication of the detection surface 10 having large area.

In addition, the second embodiment employs the plain-weave configuration for the woven configuration. Thus, it is possible to allow the detection surface 10 (the polymer sensor elements 11 and 12) to be robust and to be strong against friction, and allow especially to fabricate the detection surface 10 (the polymer sensor elements 11 and 12) easily.

Modifications of Second Embodiment

In the following, modifications (fifth to eighth modifications) of the second embodiment described above will be described. Note that the same or equivalent elements as those of the first and the second embodiments described above are denoted with the same reference numerals, and will not be described in detail.

Fifth and Sixth Modifications

Figure 12A:
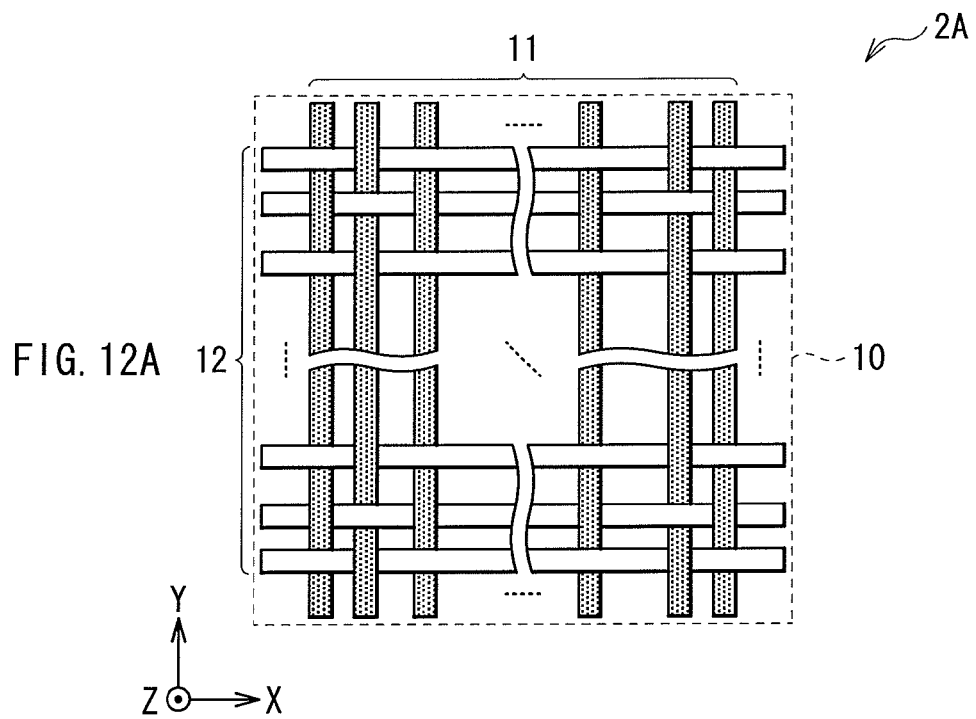
FIGS. 12A and 12B illustrate schematic configurations of geometry sensors according to a fifth modification and a sixth modification, respectively.
Figure 12B:
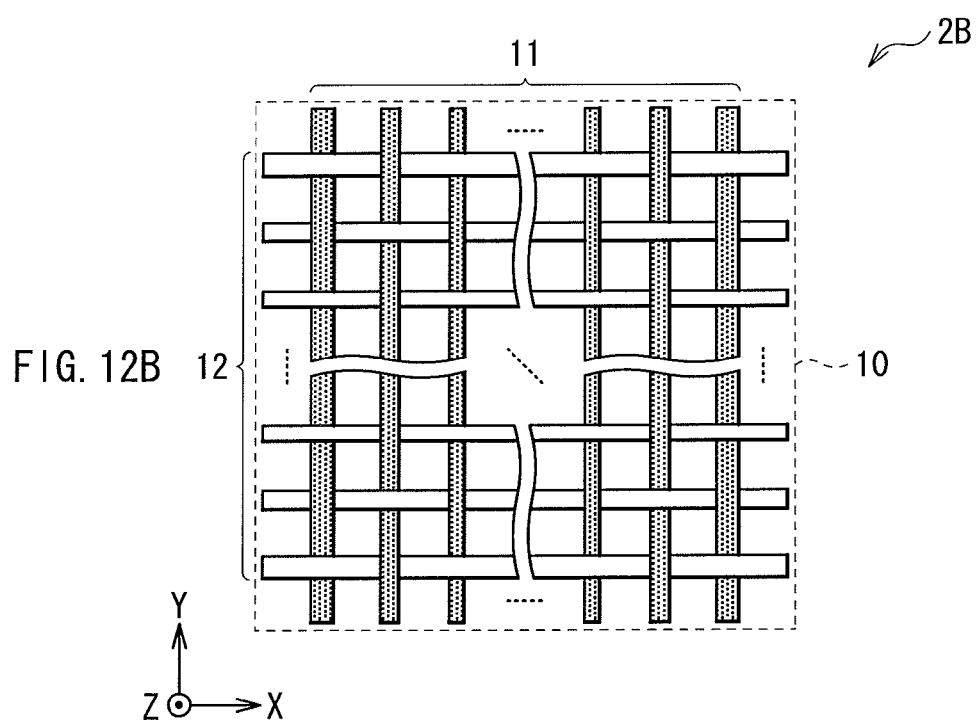

FIG. 12A illustrates a schematic configuration of a geometry sensor 2A according to a fifth modification, and FIG. 12B illustrates a schematic configuration of a geometry sensor 2B according to a sixth modification. For the purpose of convenience, illustrations of the voltage detecting sections 13 and 14 and the calculating section 15 are omitted in FIGS. 12A and 12B.

In the geometry sensor 2A according to the fifth modification, the polymer sensor elements 11 and 12 are arranged to be more sparse in an inner region than in an outer region of the detection surface 10 as in the third modification described above, and has the woven configuration described above in the second embodiment. In other words, the polymer sensor elements 11 and 12 are arranged to be more packed in the outer region than in the inner region of the detection surface 10. For example, the polymer sensor elements 11 and 12 are each arranged to be more sparse gradually from the outer region toward the inner (such as a middle part and a central part of the detection surface 10) region in the detection surface 10.

In the geometry sensor 2B according to the sixth modification, widths in the alignment directions of the polymer sensor elements 11 and 12 (i.e., the X-axis direction and the Y-axis direction, respectively) are thinner in the inner region than in the outer region of the detection surface 10 as in the fourth modification described above, and has the woven configuration described above in the second embodiment. In other words, the widths in the alignment directions of the polymer sensor elements 11 and 12 are thicker in the outer region than in the inner region of the detection surface 10. For example, the widths in the alignment directions of the polymer sensor elements 11 and 12 become thinner gradually from the outer region toward the inner (such as the middle part and the central part of the detection surface 10) region in the detection surface 10.

Each of the configurations according to the fifth and the sixth modifications makes it possible to further appropriately detect (such as further accurately detect and further sensitively detect) the surface geometry of the external object as in the third and the fourth modifications described above. In these fifth and the sixth modifications, the density of arrangement or the width in the alignment direction may be changed only for one of the polymer sensor elements 11 and 12. Also, when the plurality of polymer sensor elements are disposed side-by-side only along one direction in the detection surface 10 as in the first and the second modifications described above, the density of arrangement or the width in the alignment direction of those polymer sensor elements may be changed.

Seventh and Eighth Modifications

Figure 13A:
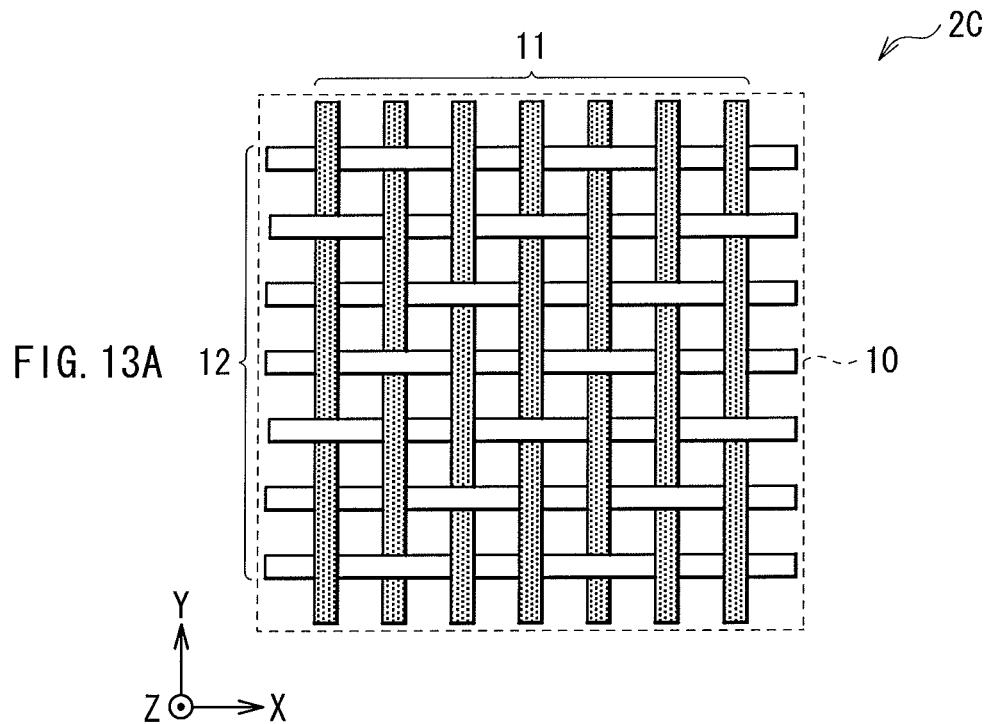
FIGS. 13A and 13B illustrate schematic configurations of geometry sensors according to a seventh modification and an eighth modification, respectively.
Figure 13B:
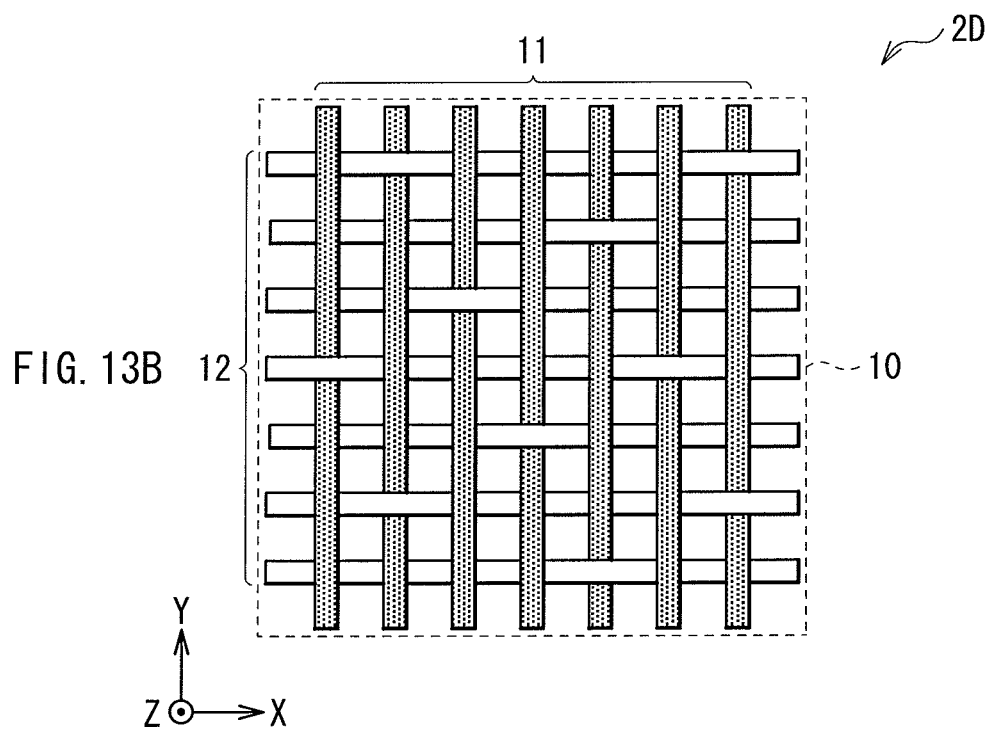

FIG. 13A illustrates a schematic configuration of a geometry sensor 2C according to a seventh modification, and FIG. 13B illustrates a schematic configuration of a geometry sensor 2D according to an eighth modification. For the purpose of convenience, illustrations of the voltage detecting sections 13 and 14 and the calculating section 15 are omitted in FIGS. 13A and 13B.

In the geometry sensor 2C according to the seventh modification, unlike the second embodiment described above, the plurality of polymer sensor elements 11 and 12 in the detection surface 10 are in a twill-weave configuration as the woven configuration. In other words, a configuration is employed where each of the plurality of polymer sensor elements 11 aligned along the X-axis direction and each of the plurality of polymer sensor elements 12 aligned along the Y-axis direction are mutually woven in an alternate fashion in a proportion in which two polymer sensor elements 11 are located above (two polymer sensor elements 11 step over) the polymer sensor element 12 and one polymer sensor element 11 is located below (one polymer sensor element 11 passes under) the polymer sensor element 12. Thus, the seventh modification is superior particularly in a stretch property of the detection surface 10 (the polymer sensor elements 11 and 12).

In the geometry sensor 2D according to the eighth modification, unlike the second embodiment described above, the plurality of polymer sensor elements 11 and 12 in the detection surface 10 are in a sateen-weave configuration as the woven configuration. In other words, a configuration is employed where each of the plurality of polymer sensor elements 11 aligned along the X-axis direction and each of the plurality of polymer sensor elements 12 aligned along the Y-axis direction are mutually woven in an alternate fashion in a proportion in which four polymer sensor elements 11 are located above (four polymer sensor elements 11 step over) the polymer sensor element 12 and one polymer sensor element 11 is located below (one polymer sensor element 11 passes under) the polymer sensor element 12. Thus, the eighth modification is superior particularly in the flexibility of the detection surface 10 (the polymer sensor elements 11 and 12).

As described, various weaving methods in textile (the woven configurations) can be basically used for the woven configuration of the polymer sensor elements 11 and 12 in the detection surface 10, and characteristics of the detection surface 10 can be adjusted on an as-needed basis depending on a technique of intersecting the polymer sensor elements 11 and 12 mutually.

Application Examples

In the following, examples of applying each of the geometry sensors described in the foregoing to an information input device (first and second application examples) will be described. Note that the same or equivalent elements as those of the embodiments and the modifications described above are denoted with the same reference numerals, and will not be described in detail.

First Application Example

Figure 14:
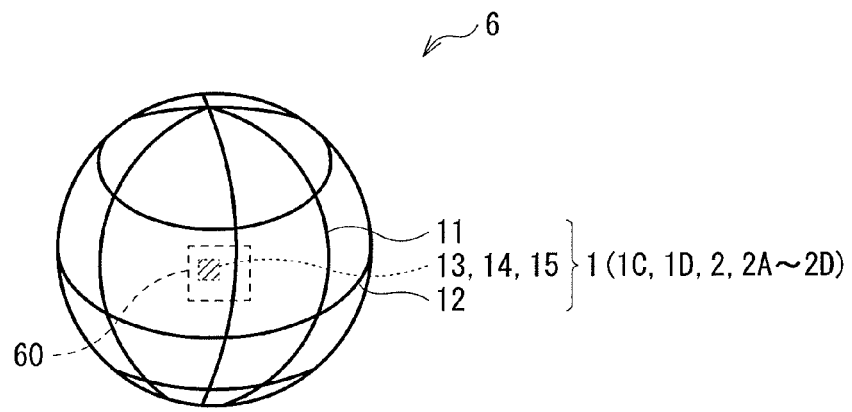
FIG. 14 illustrates a schematic configuration of an information input device according to a first application example.

FIG. 14 is a perspective view illustrating a schematic configuration of the information input device (information input device 6) according to the first application example. The information input device 6 is provided with: any one of the geometry sensors 1, 1C, 1D, 2, 2A, 2B, 2C, and 2D according to the embodiments and the modifications described above; and a circuit section 60 including such as the voltage detecting sections 13 and 14 and the calculating section 15 described above.

In the information input device 6, a detection surface having a curved geometry (a spherical surface in this application example) is formed by the polymer sensor elements 11 and the polymer sensor elements 12 both arranged in longitude. In other words, the detection surface of the geometry sensor 1, 1C, 1D, 2, 2A, 2B, 2C, or 2D in the information input device 6 has a spherical surface in this application example. Alternatively, the polymer sensor elements 11 and 12 each may be formed on an unillustrated flexible object. Further, an element such as an integrated circuit (IC) chip structuring the circuit section 60 is provided inside of the spherical detection surfaces.

Figure 15:
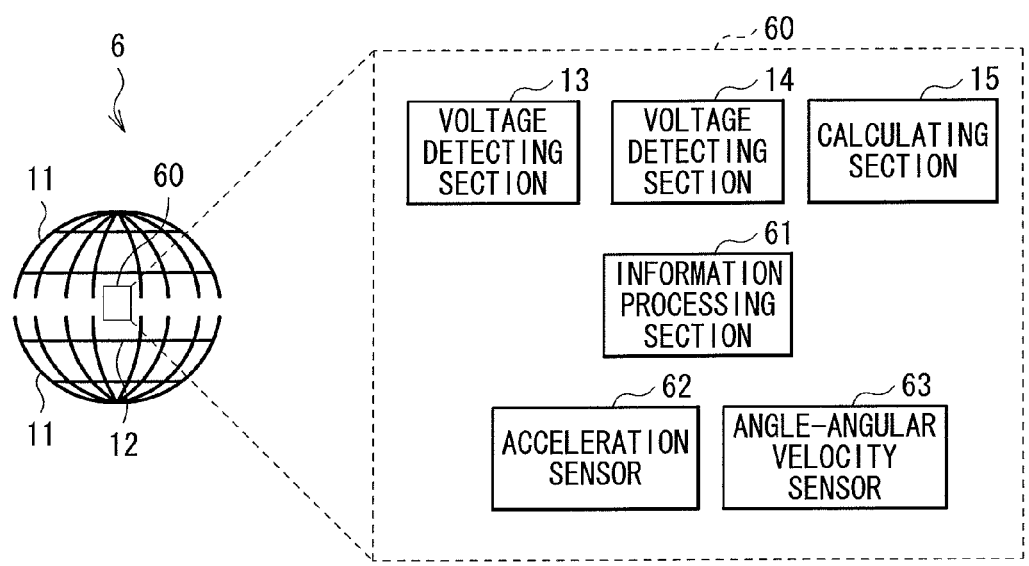
FIG. 15 illustrates an example of a detailed configuration of a circuit section illustrated in FIG. 14.

FIG. 15 illustrates an example of a detailed block configuration of the circuit section 60. The circuit section 60 is provided with an information processing section 61, an acceleration sensor 62, and an angle-angular velocity sensor (a gyro sensor) 63, in addition to the voltage detecting sections 13 and 14 and the calculating section 15 described above. Here, it is preferable that the information input device 6 be further provided with one or more of the acceleration sensor, the angle sensor, and the angular velocity sensor. Alternatively, none of those sensors may be provided in the information input device 6.

The information processing section 61 performs, based on a result of the detection of the geometry obtained such as from the geometry sensor 1 (the detection data Dout outputted from the calculating section 15) and a result of detection obtained from the acceleration sensor 62 and the angle-angular velocity sensor 63, a predetermined information processing described in detail below.

Figure 16:
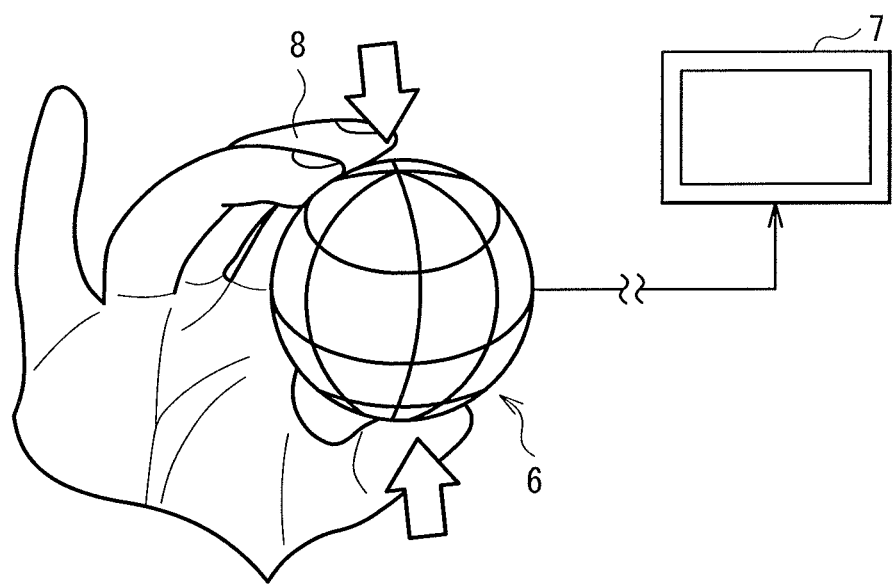
FIG. 16 schematically illustrates an example of using the information input device illustrated in FIG. 14.

FIG. 16 schematically illustrates an example of using the information input device 6. When a surface (the detection surfaces) of the information input device 6 is pressed or grabbed such as with fingers 8 of a user (operator) as illustrated, the following information is obtained or inputted from the information input device 6. First, a pressed position (a deformed position) and an amount of deformation thereof are detected such as by the geometry sensor 1. Also, since the acceleration sensor 62 and the angle-angular velocity sensor 63 are provided in the information input device 6 in this application example as described above, own factors such as a direction of movement, a moving speed, and a posture of the information input device 6 are detected.

Thus, the information input device 6 according to the first application example is capable of inputting various pieces of information as described above. Also, since the information input device 6 is provided with any one of the geometry sensors according to the embodiments and the modifications (more specifically, the polymer sensor elements 11 and 12) having the flexibility, it is possible to construct an interface which is soft. Further, since any one of the geometry sensors according to the embodiments and the modifications described above is used, it is possible to appropriately detect (such as accurately detect and sensitively detect) the surface geometry of the external object, and to easily dispose a sensor array in a curved geometry (a spherical surface in this application example).

It is to be noted that, for example, the various pieces of information obtained or inputted from the information input device 6 may be outputted to a display device 7 serving as an external display monitor to display the information thereon. In other words, the information input device 6 and the display device 7 may be used to construct an information input system, for example.

Figure 17:
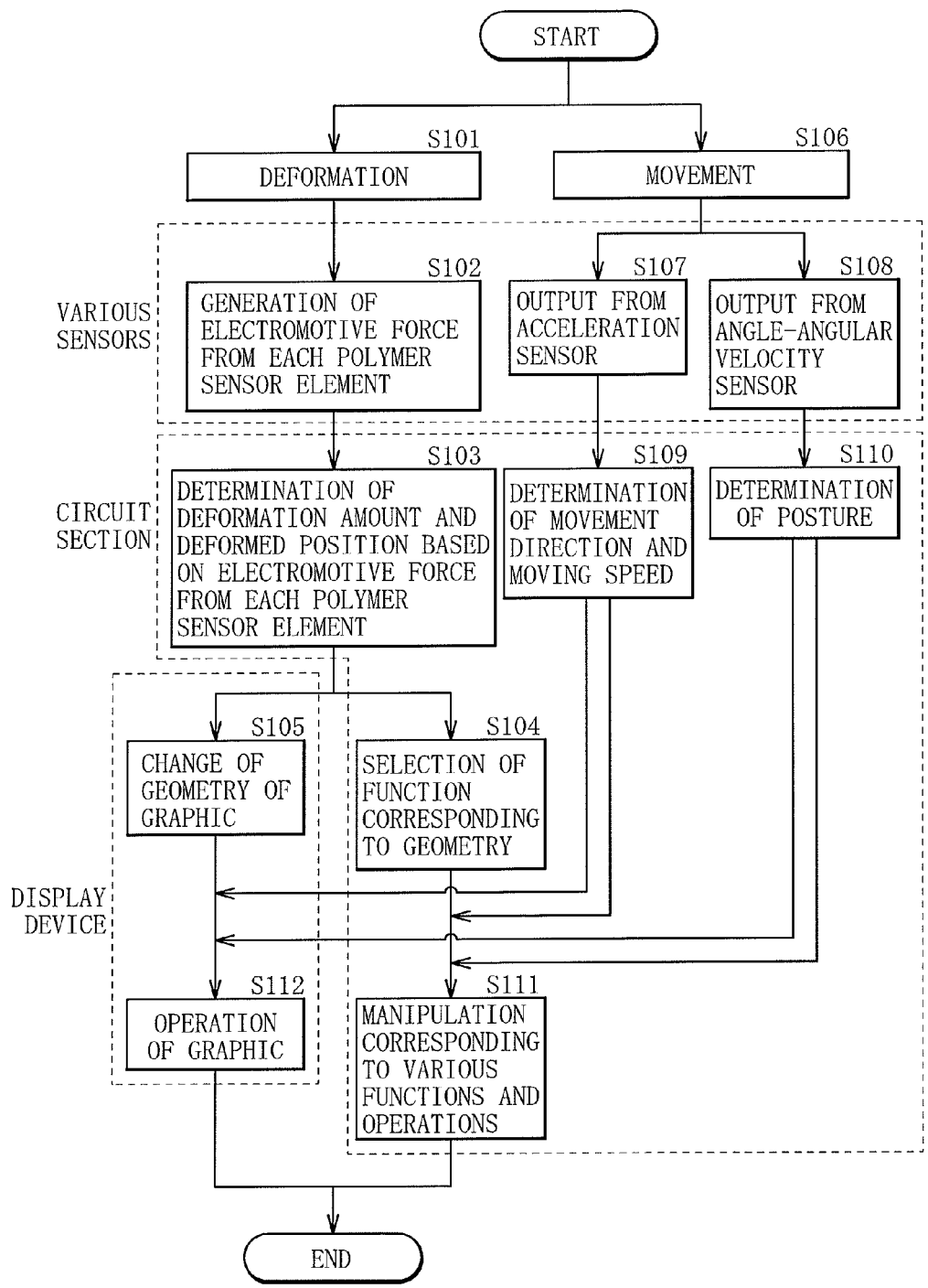
FIG. 17 is a flow chart illustrating an example of an operation etc. of the information input device illustrated in FIG. 14.

FIG. 17 is a flow chart illustrating an example of an operation etc. of the information input device 6. In FIG. 17, operation contents of: the various sensors (including any one of the geometry sensors, the acceleration sensor 62, and the angle-angular velocity sensor 63); the circuit section 60; and the display device 7 are each represented in a corresponding region surrounded by a broken line.

First, when the polymer sensor elements 11 and 12 in any one of the geometry sensors according to the embodiments and the modifications are deformed (step S101), the electromotive force is generated in each of the polymer sensor elements 11 and 12 as described in the embodiments and the modifications (step S102). Then, the voltage detecting sections 13 and 14 and the calculating section 15 determine (calculate), in a manner described in the embodiments and the modifications above, the corresponding deformation amount and the deformed position based on the electromotive force obtained from each of the polymer sensor elements 11 and 12 (step S103). Then, the information processing section 61 uses the pieces of information on the thus-inputted (detected) deformation amount and the deformed position to select a function corresponding to the geometry detected (step S104). Also, the information processing section 61 may output those pieces of information to the display device 7 to allow the display device 7 to change a geometry of a content (such as a graphic) displayed thereon accordingly (step S105).

On the other hand, when the information input device 6 itself is moved by an action performed by the user (step S106), the result of detection on the acceleration detected by the acceleration sensor 62 and the result of detection on the angle and the angular velocity each detected by the angle-angular velocity sensor 63 are outputted in accordance with a content of the movement (steps S107 and S108). Then, the information processing section 61 determines (calculates) the direction of movement and the moving speed of the information input device 6 based on the result of the detection on the acceleration (step S109), and also determines (calculates) the posture of the information input device 6 (step S110). Then, the information processing section 61 uses the various pieces of information thus-inputted (detected) from the various sensors to perform a control which prompts a user to carry out an operation or a manipulation corresponding to various functions and operations (step S111). Also, the information processing section 61 may output those pieces of information to the display device 7 to allow the display device 7 to operate the content (such as the graphic) displayed thereon accordingly (step S112).

Second Application Example

Also, other than the information input device 6 described above in the first application example, the information input device having: any one of the geometry sensors according to the embodiments and the modifications; and the above-described circuit section 60, may have a wearable configuration which allows a user to be equipped (fitted) with the same or to wear the same. For example, the polymer sensor elements 11 and 12 of any one of the geometry sensors according to the embodiments and the modifications may be used to manufacture a fabric, so as to fabricate members such as clothes, gloves, and adhesive plaster-like sheets that utilize respectively any one of the geometry sensors according to the embodiments and the modifications.

The information input device according to the second application example having the configuration described above is also capable of inputting various pieces of information which are similar to those according to the first application example described above, and of thereby detecting an action of the user wearing the same. Also, since the information input device according to the second application example has any one of the geometry sensors according to the embodiments and the modifications which is flexible (i.e., the polymer sensor elements 11 and 12), it is possible to input the information and detect the action without hampering the action of the user or without giving the user a sense of discomfort.

Figure 18:
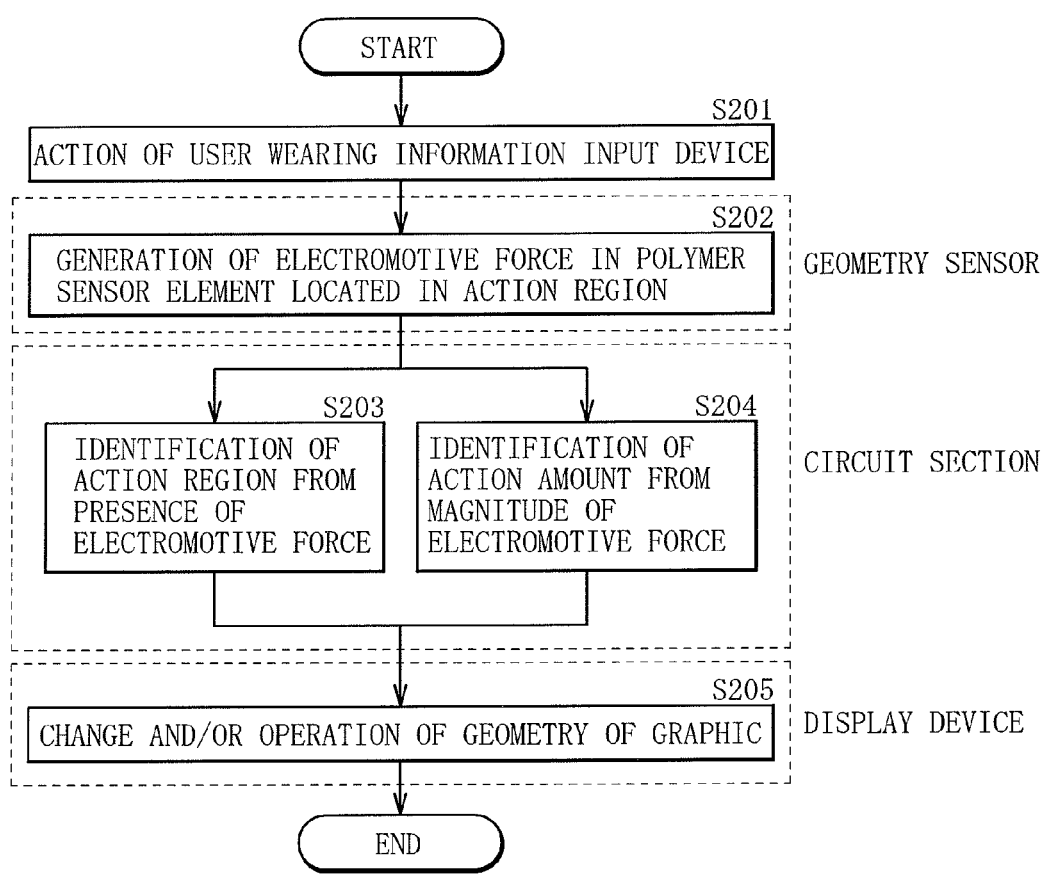
FIG. 18 is a flow chart illustrating an example of an operation etc. of an information input device according to a second application example.

FIG. 18 is a flow chart illustrating an example of an operation etc. of the information input device according to the second application example. In FIG. 18, operation contents of: the various sensors (including any one of the geometry sensors, the acceleration sensor 62, and the angle-angular velocity sensor 63); the circuit section 60; and the display device 7 are each represented in a corresponding region surrounded by a broken line as in the FIG. 17. However, it is to be noted that one example is described here where the acceleration sensor 62 and the angle-angular velocity sensor 63 are not provided in the information input device (the information input device only includes any one of the geometry sensors according to the embodiments and the modifications).

First, when the user wearing the information input device acts (step S201), the polymer sensor elements 11 and 12 in any one of the geometry sensors according to the embodiments and the modifications deform and the electromotive force is generated in the polymer sensor elements 11 and 12 that are located in a region (a site) in which the action is made (step S202). Then, the voltage detecting sections 13 and 14 and the calculating section 15 determine (calculate) the corresponding deformation amount and the deformed position based on the electromotive force obtained from each of the polymer sensor elements 11 and 12.

Then, the information processing section 61 uses the pieces of information on the thus-inputted (detected) deformation amount and the deformed position to detect the action of the user. For example, the information processing section 61 identifies the region (the site) where the action is made according to the presence or absence of the electromotive force (i.e., by using the information on the deformed position) (step S203). Also, the information processing section 61 identifies an amount of action according to a magnitude of the electromotive force (i.e., by using the information on the deformation amount) (step S204). Then, the information processing section 61 uses the pieces of information on the thus-identified action region and the action amount to select a corresponding function, for example. Also, the information processing section 61 may output those pieces of information to the display device 7 to allow the display device 7 to change a geometry of a content (such as a graphic) displayed thereon accordingly, or to operate the content (such as the graphic) displayed thereon accordingly (step S205).

Alternative Modifications

Although the technology has been described in the foregoing by way of example with reference to the embodiments, the modifications, and the application examples, the technology is not limited thereto but may be modified in a wide variety of ways.

For example, the alignment of the polymer sensor elements in the detection surface is not limited to each of those described in the embodiments, the modifications, and the application examples. The plurality of polymer sensor elements may be arranged side-by-side along at least one direction in the detection surface.

Also, the configuration of the polymer sensor elements is not limited to each of those described in the embodiments, the modifications, and the application examples. Further, the stacked structure of the polymer sensor elements is not limited to each of those described in the embodiments, the modifications, and the application examples, and may be modified on an as-needed basis.

The geometry sensors according to the embodiments, the modifications, and the application examples are applicable to any electronic unit in any field, such as, for example but not limited to, cellular phones and game consoles.

The present disclosure contains subject matter related to that disclosed in Japanese Priority Patent Application JP 2010-173500 filed in the Japan Patent Office on Aug. 2, 2010, the entire content of which is hereby incorporated by reference.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. A geometry sensor, comprising:
a detection surface including a plurality of polymer sensor elements and configured to detect an external object, the polymer sensor elements being arranged side-by-side along one or more directions and each generating a voltage according to a deformation of that polymer sensor element; and
a detecting section detecting a surface geometry of a region in the external object that is in contact with the detection surface, based on the voltage obtained from each of the polymer sensor elements in the detection surface.

2. The geometry sensor according to claim 1, wherein the polymer sensor elements are arranged side-by-side along two directions which are orthogonal to each other in the detection surface.

3. The geometry sensor according to claim 2, wherein the plurality of polymer sensor elements includes a first polymer sensor elements arranged along a first direction of the two directions orthogonal to each other and a second polymer sensor elements arranged along a second direction of the two directions are in a woven configuration in which the first and second polymer sensor elements are woven mutually as a whole.

4. The geometry sensor according to claim 3, wherein the woven configuration is selected from a group including a plain-weave configuration, a twill-weave configuration, and a sateen-weave configuration.

5. The geometry sensor according to claim 1, wherein the polymer sensor elements are arranged to be more sparse in an inner region of the detection surface than in an outer region of the detection surface.

6. The geometry sensor according to claim 1, wherein widths in an alignment direction of the polymer sensor elements are thinner in an inner region of the detection surface than in an outer region of the detection surface.

7. The geometry sensor according to claim 1, wherein each of the polymer sensor elements includes:
a pair of electrode films; and
a polymer film inserted between the pair of electrode films.

8. The geometry sensor according to claim 7, wherein the polymer film comprises an ion-conductive highly-polymerized compound film impregnated with a cation substance.

9. An information input device with a geometry sensor, the geometry sensor comprising:
a detection surface including a plurality of polymer sensor elements and configured to detect an external object, the polymer sensor elements being arranged side-by-side along one or more directions and each generating a voltage according to a deformation of that polymer sensor element; and
a detecting section detecting a surface geometry of a region in the external object that is in contact with the detection surface, based on the voltage obtained from each of the polymer sensor elements in the detection surface.

10. The information input device according to claim 9, further comprising one or more sensors selected from a group including an acceleration sensor, an angle sensor, and an angular velocity sensor.

11. The information input device according to claim 9, wherein the detection surface comprises a spherical surface.

12. The information input device according to claim 9, wherein the information input device is wearable.

* * * * *